March 6, 1951   D. T. HURD   2,544,320
FABRICATED ARTICLE
Filed Oct. 24, 1946
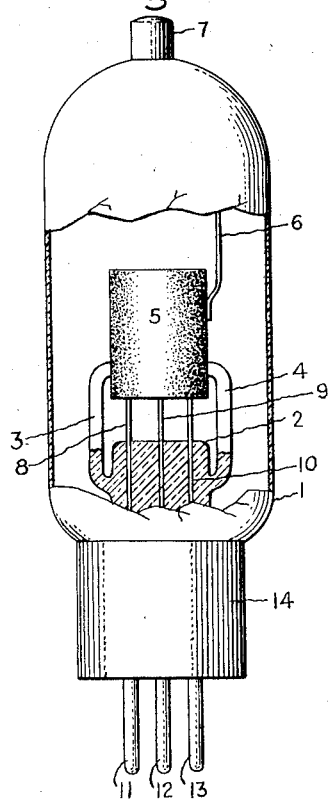
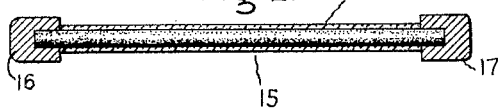
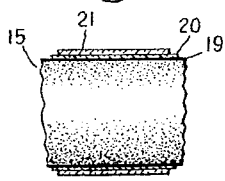
Inventor:
Dallas T. Hurd,
by Harry E. Dunham
His Attorney.

Patented Mar. 6, 1951

2,544,320

UNITED STATES PATENT OFFICE 2,544,320

FABRICATED ARTICLE

Dallas T. Hurd, Schenectady, N. Y., assignor to General Electric Company, a corporation of New York Application October 24, 1946, Serial No. 705,284

4 Claims. (Cl. 313—355)

The present invention comprises improved fabricated articles in which parts consisting of carbonaceous material, such as graphite, are united with parts consisting of ceramic material by a bonding layer comprising boron.

The chemical inertness of carbon at elevated temperature with respect to glass, enamels, oxides or other ceramic compositions is well known. It is commonly utilized in tools for handling fused or plastic glasses in glass fabrication.

In accordance with my invention such ordinarily incompatible materials as carbon and glass are united or welded to one another by applying to the surface of the carbon article a thin bonding layer of elemental boron and thereupon bringing the thus coated surface in contact with a desired ceramic material at an elevated temperature.

The accompanying drawing shows in Fig. 1 a side elevation partly in section of an electric discharge device embodying my invention; Fig. 2 is a section of a resistance unit, or heater embodying my invention, and Fig. 3 is a fragmental view of a modification.

The device shown in Fig. 1 is an electric discharge device which is shown in somewhat conventionalized form. It comprises an envelope 1 commonly consisting of glass in which is mounted a stem 2, also consisting of glass. Upon laterally extending glass arms 3, 4 of the stem a cylindrical graphite electrode 5 is supported. The graphite electrode is coated with boron, preferably only at the region to be united with glass. The deposition of boron may be carried out by thermal decomposition of a volatile boron compound on the surface to be coated. For example, the graphite electrode 5 when heated to an elevated temperature as by high frequency induction, or other convenient means, is brought into contact in a confined space with a jet or atmosphere of volatile boron compound such as $B_2H_6$ or other volatile hydride of boron. Likewise the electrode may be coated by heating to an elevated temperature in an atmosphere comprising a volatile boron halide such as the chloride and a reducing gas, such as hydrogen or hydrocarbon gas.

Boron in a finely divided state may be applied upon a carbonaceous surface with a suitable binder and united with the carbon by heat to provide a bonding layer to which glass, enamel or other ceramic material may be sealed.

When the glass parts to be joined to the carbon part are brought into contact in a plastic heated state with the boron-coated carbon surface a strong integral union results. The electrode thus joined to glass supports is not subject to undue vibration or breakage. The electrode 5 is connected electrically by a conductor 6 to an external contact 7 located at the opposite end of the envelope 1. Conductors 8, 9, 10 leading to cathode, grid or other electrodes are shown as sealed into the stem 2. They are connected to conventional external contacts 11, 12, 13 of a base 14.

My invention may be utilized in various other embodiments, for uniting by boron-bonding layers coatings of glass, or enamel or other suitable vitreous material to carbonaceous materials. For example, a coating of ceramic material may be bonded to the surface of carbon articles in order to electrically insulate such articles or to protect them from oxidation. Fig. 2 shows an elongated conductor 15 consisting of graphite, or ordinary carbon, which is provided with electric terminals 16, 17. The carbonaceous conductor is coated with a layer 18 of vitreous material which is joined to the carbonaceous surface by a bonding layer of boron. This coated conductor may be employed as a resistance unit for electrical heaters, the carbon being protected from oxidation at elevated temperatures by the coating of ceramic or vitreous material.

By the term "ceramic composition" I mean to include not only compounds of silicon but also compounds of other elements commonly employed in the formation of fluxes, glasses and glazes, such as the oxides and other compounds of aluminum, beryllium, zirconium and boron.

Various modifications are to be considered within the scope of my invention. For example, in some cases it may be desirable to provide a plurality of layers of ceramic material. A carbon article such as shown in Fig. 3 may be coated first with a boron bonding film 19 then with a thin glassy foundation layer 20 and finally with a layer 21 of refractory oxide such as alumina or zirconia.

What I claim as new and desire to secure by Letters Patent of the United States is:

1. A fabricated article consisting of members respectively consisting of carbon and a ceramic composition and which are sealed to one another by a bonding material comprising elemental boron.

2. A fabricated article comprising a carbon electrode, a support therefor consisting of glass and a bonding layer including elemental boron whereby said electrode and support are integrally united.

3. The method of joining a ceramic composition to a surface of carbon which consists in first depositing a film of elemental boron at an elevated temperature upon the carbon surface to be united with the ceramic composition and then bringing said ceramic composition while heated to a temperature of plasticity into contact with the boron-coated surface.

4. A fabricated article comprising a carbon body coated with an oxidation-resistive layer of a ceramic composition, the layer being united to the carbon article by a bonding medium comprising elemental boron.

DALLAS T. HURD.

REFERENCES CITED

The following references are of record in the file of this patent:

UNITED STATES PATENTS

| Number | Name | Date |
| --- | --- | --- |
| 1,266,614 | Newcomb | May 21, 1918 |
| 1,573,315 | Griffin | Feb. 16, 1926 |